United States Patent [19]
Fairchild

[11] Patent Number: 4,744,965
[45] Date of Patent: May 17, 1988

[54] PROCESS FOR PRODUCING GRANULAR DIAMMONIUM PHOSPHATE

[75] Inventor: William D. Fairchild, Valrico, Fla.

[73] Assignee: Conserv, Inc., Nichols, Fla.

[21] Appl. No.: 901,267

[22] Filed: Aug. 28, 1986

[51] Int. Cl.$^4$ ............................................ C01B 25/28
[52] U.S. Cl. ...................................... 423/310; 71/34; 71/43
[58] Field of Search ...................... 423/310; 71/34, 43

[56] References Cited

U.S. PATENT DOCUMENTS

| | | | |
|---|---|---|---|
| 2,963,359 | 12/1960 | Moore et al. | 71/43 |
| 3,199,973 | 8/1965 | Moore | 71/43 |
| 3,485,580 | 12/1969 | Mischel et al. | 423/310 |
| 3,490,892 | 1/1970 | Simpson | 71/43 |
| 3,985,538 | 10/1976 | Hicks et al. | 71/43 |
| 4,028,087 | 6/1977 | Schultz et al. | 71/43 |
| 4,493,820 | 1/1985 | Clausen | 71/43 |

FOREIGN PATENT DOCUMENTS

| | | | |
|---|---|---|---|
| 2437386 | 5/1980 | France | 71/34 |
| 1379761 | 1/1975 | United Kingdom | 71/34 |
| 424590 | 2/1975 | U.S.S.R. | 71/43 |

Primary Examiner—John Doll
Assistant Examiner—Wayne A. Langel
Attorney, Agent, or Firm—Frijouf, Rust & Pyle

[57] ABSTRACT

A process is disclosed for the manufacture of granular diammonium phosphate (DAP) by reacting anhydrous ammonia with phosphoric acid in a reactor to form reaction product consisting of a partially reacted slurry of monoammonium phosphate and diammonium phosphate. The slurry is pumped to a rotary granulator-reactor where it is further reacted with anhydrous ammonia to form a solid granular diammonium phosphate mixture having a range of particle sizes consisting of undersize, oversize and product. After drying the diammonium phosphate mixture, a portion of the dried granular diammonium phosphate mixture is diverted back to the granulator-reactor prior to delivery to a classifying means. The portion of dried granular diammonium phosphate mixture not diverted to the granulator-reactor, is introduced to a classifying means set to a narrow separation to separate undersize and oversize granular particles from the desired product granular particles. The oversize granular particles are milled and recycled to the granulator-reactor along with the undersize granular particles obtained during the classifying process. The desired granular particles which have a size in the range of 2 mm to 4 mm are collected. About 90% of the granules collected by the classifying means as product are in a range of the desired granule size of 2 mm to 4 mm.

11 Claims, 1 Drawing Sheet

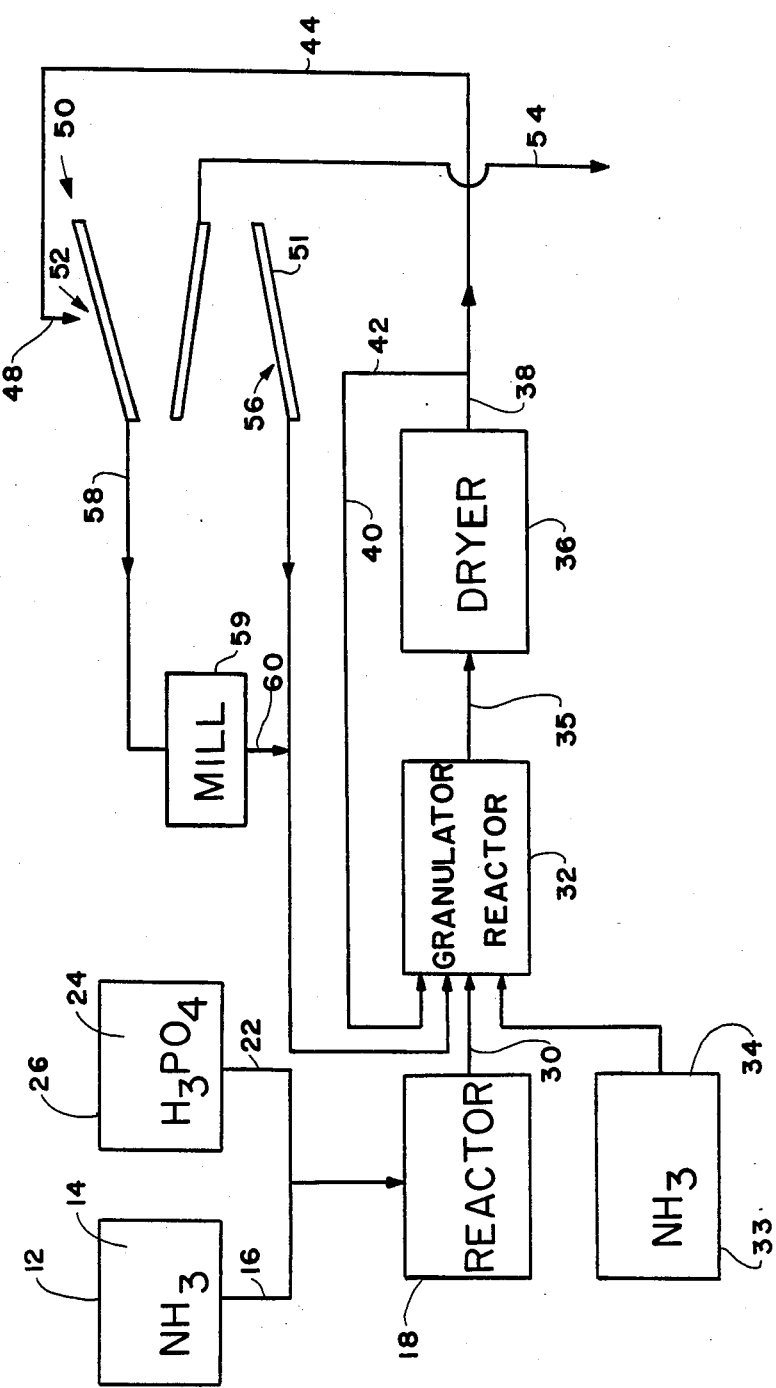

PROCESS FOR PRODUCING GRANULAR DIAMMONIUM PHOSPHATE

BACKGROUND OF THE INVENTION

1. Field of the Invention

This invention relates to a process of preparing a solid granular diammonium phosphate, and more particularly to a process including a diversion step after the drying step and prior to the classifying step to enhance the production of a particular range of granular sizes of solid diammonium phosphate within the broad production range.

2. Information Disclosure Statement

Granular diammonium phosphate is conventionally prepared by reacting an aqueous solution of phosphoric acid with ammonia to prepare a partially reacted slurry of monoammonium phosphate and diammonium phosphate (also referred to as "DAP"). The slurry is pumped to a rotary granulator-reactor where further ammonia is added to yield a diammonium phosphate product. The diammonium phosphate product leaving the grandulator-reactor is transferred to a dryer. After drying, the granular product is separated by a classifying means, such as, a set of screens including an oversize screen and a product screen to separate out the oversize and undersize granular diammonium phosphate from the desired granular diammonium phosphate product. The recycle may include a portion of product received from the classifying screens. In the conventional process the size of the granule produced depends largely upon the granulator. Generally, the granulator produces a relatively wide or broad range of granular sizes and which, for the most part, does not vary within the range. This range is peculiar to a particular granulator although, increasing the recycle tends to decrease the size of the granule produced and to decrease the ability to make a narrow product cut from the entire process output.

According to at least one prior art process, it is desirable to decrease the amount of recycle since the amount of recycle interferes with plant capacity. High recycle rates are also discouraged because of the high investment in equipment for the purpose of dealing with the recycle.

To minimize the amount of recycle a prior art process utilizes a kneading mill to prevent agglomeration of the larger particles thereby preventing formation of even larger sized particles.

U.S. Pat. No. 3,199,973 teaches a process of preparing diammonium phosphate utilizing a recycle step which includes the milled oversizes and fines from the screening process recycled to the dryer.

U.S. Pat. No. 2,946,655 teaches a process for the preparation of diammonium phosphate where the classifying step separates the product from the coarse and fines and returns the milled coarse and fines back to the heater to supply the solid diammonium phosphate particle for bringing the solution to the saturation state.

U.S. Pat. No. 3,249,421 teaches the importance of reducing the amount of recycle and teaches a process for preparing diammonium phosphate which recycles the fine, mills the coarses and recycles the milled coarses with the fines to the granulator.

U.S. Pat. No. 3,153,574 teaches a process for the production of granular diammonium phosphate which utilizes a recycle step recycling the fines obtained from the screening process to the ammoniator-granulator. It is noted that the fines are of a predetermined size.

U.S. Pat. No. 2,999,006 teaches a method for preparing substantially dry diammonium phosphate from monoammonium phosphate and gaseous anhydrous ammonia.

U.S. Pat. No. 3,249,421 teaches a method of preparing a granulated fertilizer containing substantial or a large amount of diammonium phosphate. The process includes a recycle step which recycles the milled oversize and the fines obtained from the classifying means back to the granulator. A substantial portion of the medium size particles obtained from the classifying means are transported to storage. Any remaining medium size particles obtained from the classifying means may be recycled through the granulator.

U.S. Pat. No. 3,485,580 teaches a method for producing granular diammonium phosphate. The process recycles the milled oversize and the fines obtained from the separating means back to the blunger.

U.S. Pat. No. 2,963,359 teaches a process for preparing diammonium phosphate which recycles the fines and grinds the oversize and part of the product in a grinder and recycles the fines and ground oversize end product to the granulator. The purpose of the diammonium phosphate being added to the granulator is to provide a bed for the carrier of phosphoric acid and is in an amount of about 3 times the product made. The particles of the phosphate making up the beds are properly sized or ground to a suitable fineness to finish sufficient carrier and to supply surface area for the liquid phosphoric acid and the furnish proper nuclei for granulation.

U.S. Pat. No. 3,514,255 teaches the production of granular diammonium phosphate where the recycle step uses the diammonium phosphate fines obtained from the screening process and from the milled oversize which are reacted with the phosphoric acid feed stream to produce an intermediate solid granular stream which is substantially ammoniated by reaction with the ammonia feed in a separate step.

Defensive publication No. T101,203 published Nov. 3, 1981 teaches a process for the production of granular diammonium phosphate which recycles the fines obtained from the screening process to the drum granulator.

It is an object of this invention to produce and collect a large percentage of a relatively narrow range of DAP particle sizes without increasing the percentage of undersize or oversize and without overloading the classifying system.

It is a further object of this invention to provide a process for the manufacture of solid granular diammonium phosphate which results in a homogeneous, closely sized, granular product with a high ratio of nitrogen to $P_2O_2$.

It is a further object of this invention to provide an improved method for preparing solid granular diammonium phosphate without broading the range of granular sizes produced while maintaining the desired narrow product granule range and not overloading the screening system.

It is a further object of this invention to provide a method of preparing a solid granular diammonium phosphate with a relatively uniform particle size.

It is a further object of this invention to increase the production by approximately 30% of 2-4 mm granular diammonium phosphate over the prior art process.

It is a further object of this invention to shift within the broad range of DAP particle size produced by the conventional process by enhancing the production of a narrow range of DAP particle size distribution by manipulating the percent of DAP product mixture diverted directly from the dryer and introduced to the granulator-reactor while maintaining a narrow cut of DAP product collected by the classifying means.

It is a further object of this invention to prepare a narrow separation of diammonium phosphate granule which stores better and has less breakage than the diammonium phosphate granule obtained from the process without a diversion step.

It is a further object of this invention to increase the effective screening capability of the separation system and reduce the milling requirements of the recycle system.

It is a further object of this invention to provide an increase in the production of 2-4 mm granular diammonium phosphate by diverting, without classifying, approximately 30 to 50 percent of the diammonium phosphate product mixture prior to delivery to a screening means.

It is a further object of this invention to provide an increased granular particle size without increasing the percentage of oversize or undersize.

It is a further object of this invention to provide a change in the materials handling system to result in a more uniform product particle size of solid diammonium phosphate.

It is an object of this invention to increase the productivity of the desired 2-4 mm granular diammonium phosphate product over the production of 2-4 mm diammonium phosphate without diversion of dried diammonium phosphate prior to introducing the unclassified diammonium phosphate to the classifying means.

It is an advantage of this invention to reduce the cost in obtaining the desired granular size by increasing the percentage of desired product produced by the process of preparing diammonium phosphate.

It is an advantage of this invention to reduce the amount of oversize to be milled thereby decreasing electrical and maintenance costs in operating the plant.

The foregoing has outlined some of the more pertinent objects of the present invention. These objects should be construed to be merely illustrative of some of the more pertinent features and applications of the invention. Many other beneficial results can be obtained by applying the disclosed invention is a different manner or modifying the invention within the scope of the disclosure. Accordingly, other objects and a fuller understanding of the invention may be had by referring to the summary of the invention and the detailed description describing the preferred embodiment in addition to the scope of the invention defined by the claims taken in conjunction with the accompanying drawing.

SUMMARY OF THE INVENTION

The process for the manufacture of granular diammonium phosphate according to the present invention is defined by the appended claims with specific embodiments shown in the attached drawing. For purposes of summarizing the invention, the invention relates to a process for the manufacture of solid diammonium phosphate having granular particle size in a range of 2 mm to 4 mm where about 75 to 85 percent of the granules produced are in a range of the desired granule size of 2 mm to 4 mm. The solid granular diammonium phosphate is prepared by reacting anhydrous ammonia with phosphoric acid in a reactor to form a partially reacted aqueous slurry of monoammonium phosphate and diammonium phosphate. The partially reacted slurry is pumped to a granulator-reactor and further reacted with anhydrous ammonia to form a moisture containing solid granular diammonium phosphate mixture having a range of particle sizes consisting of oversize, undersize and product. The moisture containing solid granular diammonium phosphate mixture is introduced to a dryer dried. Upon discharging the drier a portion of the dried solid granular diammonium phosphate mixture is diverted back to the granulator-reactor. The portion not diverted is separated or classified by a separating means to separate the oversize and undersize from the desired product size diammonium phosphate. Separation is attained by setting to a narrow size separation (difference between oversize and product screen) an oversized screen to separate oversized granular particles and a product screen to separate undersized granular particles from the product granular particles. The oversize product granular particles are milled and recycled along with the undersized granular particles obtained during the classifying process to the granulator-reactor. The desired granular product is collected wherein about 90% of the granules collected by the classifying means are in a range of the desired granule size of 2 mm to 4 mm and about 10% of the granules collected by the classifying means are off size (roughly about 2% oversize and 8% undersize) where 40% of the dryer discharge is diverted to the granulator-reactor and the screens are set at +5 oversize and +7 product.

In a more specific embodiment of the present invention the process includes a classifying means comprising a set of screens consisting of an oversize screen and an undersize screen being set to a narrow size separation without overloading. The product granules too big to pass through the oversize screen are milled and returned to the granulator-reactor along with the fine product passing through the product screen. Preferably, the oversize screen is set at about +5 mesh (Tyler) and the product screen is set at about +7 mesh (Tyler). The most preferred screen setting are +5 mesh for the oversize and +7 mesh for the product to attain the narrowest cut. These screen settings yield about 90% of the product DAP granules being 2 mm-4 mm in size with a 40% diversion.

In a further embodiment of the present invention the process preferably includes diverting, prior to delivery to the classifying means, about 30 to 50 percent of the dried granular diammonium phosphate to the granulator-reactor. Diversion of about 35 to 45 percent of the dried solid granular diammonium phosphate mixture is preferred with the diversion of about 40% of the dried granular diammonium phosphate to the granulator-reactor being most preferred.

The invention embraces dividing the dried granular diammonium phosphate into a first portion and a second portion as the dried diammonium phosphate exits the drying apparatus and prior to being introduced into the classifying means. The first portion is then fed back to the first part of the granulator-reactor, bypassing screens, mills, etc. The second portion is introduced to the classifying means for classifying.

The desired 90% 2-4 mm diammonium phosphate granular size product is mixed with similarly sized fertilizer components thereby minimizing "settling out" of undersize and "floating" of oversize diammonium phosphate granules.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawing in which:

The FIGURE is a schematic illustration of one embodiment of the process of the invention.

Similar reference characters refer to similar parts throughout the view of the drawing.

DETAILED DISCUSSION

The FIGURE shows a schematic view of an embodiment of the present invention. Anhydrous ammonia 14 flows from holding tank 12 through conduit 16 and into reactor 18. Phosphoric acid 24 flows through conduit 22 from holding tank 26 and into reactor 18 where the anhydrous ammonia and phosphoric acid are partially reacted to form a reaction product slurry 30 comprising monoammonium phosphate and diammonium phosphate. The slurry 30 is pumped to a rotating drum granulator-reactor 32 where more anhydrous ammonia 34, from holding tank 33, is added in order to complete the production of diammonium phosphate from the monoammonium phosphate. The moisture containing diammonium phosphate 35 exists from the granulator-reactor 32 and is transferred to a rotating drum dryer 36. During the drying process, excess moisture is removed resulting in a dry and solid granulator diammonium phosphate product mixture. A portion 40 of the dried product mixture 38 is diverted without regard to particle size through conduit 42 back to the granulator-reactor 32. The portion of the dried product not diverted 44, is transferred through conduit 48 to the classifying means 50, such as a set of screens, to separate the oversize 52 and undersize or fines 56 from the desired product 54. The oversize 52 is transferred through conduit 58 to a mill 59 which reduces the oversize particle. The fines 56 are collected on tray 51 during the separation process. The milled oversize 60 is transferred along with the fines 56 back to the granulator-reactor 32. The desired product size 54 of 2 to 4 mm is collected and stored or packaged.

The preferred process is a continuous process where reactor conditions comprised a mole ratio of about 1.48 (ammonia to phosphoric acid), a specific gravity of about 1.57, an ammonia flow of about 13,000 pounds per hour and a phosphoric acid flow of about 125 gpm for a 30% concentration or a flow of about 54 gpm for a 52% concentration phosphoric acid. The granulator-reactor conditions comprised an ammonia flow of about 11,500 pounds per hour and a slurry flow of about 160 gpm. Other reactor and granulator-reactor parameters may be used and are selectable to one skilled in the art. A rotating dryer at a temperature not to exceed about 200° F. to 210° F. (to protect against thermal destruction of product) was used to substantially remove moisture from the product mixture. After drying, about 40% of the total product solid granular diammonium phosphate mixture was diverted directly back to the inlet of the granulator-reactor without delivery to the sizing screens. The 60% portion of the total product solid granular diammonium phosphate mixture was separated or screened. The screens were set to +5 for the oversize and +7 for product, resulting in about a 30% increase in productivity of the desired 2-4 mm solid granular diammonium phosphate relative to the process without the diversion step. The resulting product had a chemical analysis of 18-46-0, with 1.1% moisture, pH of 7.5, 1.5% iron ($Fe_2O_3$), 1.4% aluminum ($Al_2O_3$), 1.6% sulfur (S), 0.5% calcium (CaO), 0.7% magnesium (MgO), manganese (trace). The product had the following physical characteristics: angle of repose 29/31°, water solubility, percent: nitrogen 97, available $P_2O_2$ 90; bulk density lbs/cu. ft. 60-62.

The process without the diversion step and with changing the screens to select the 2-4 mm size granular results in only about 60% of the granules produced in the range of 2-4 mm. Without the diversion step, the screens tended to overload. With the diversion step, about 90% of the granules collected are of the desired granule size of 2 mm to 4 mm.

Utilizing the same reaction conditions and apparatus, a comparison between the prior art process and the process of the present invention follows:

| Average Screen Analysis DAP | | |
|---|---|---|
| Particle Size 2-4 mm | | |
| Prior Process: (no diversion step) | | |
| 65.8% (13 consecutive days) | 66.7% (1 day) | 54.6% (2 consecutive days) |
| Process of the Invention: (diversion step, 40%) | | |
| 90% (17 consecutive days) | 89.4% (17 consecutive days) | |

The process of the invention enhances the production of a narrow range of granular diammonium phosphate particle size distribution comprising reacting anhydrous ammonia and aqueous phosphoric acid in a reactor to obtain a reaction product slurry of monoammonium phosphate and diammonium phosphate. The slurry is further reacted in a rotating drum granulator-reactor with anhydrous ammonia to yield a moisture containing diammonium phosphate. The moisture containing diammonium phosphate is introduced into a rotating drum dryer to remove the moisture from the diammonium phosphate resulting in a dried granular diammonium phosphate mixture. The dried solid granular diammonium phosphate is fed into a classifying means for separating into oversize, undersize and product granular diammonium phosphate. The oversize is milled and recycled along with the undersize obtained from the classifying means back to the granulator-reactor. The desired granular size is collected from the classifying means to be stored, packaged or shipped. The improvement of the conventional process comprises diverting a portion of the dried solid granular diammonium phosphate mixture after drying and prior to delivery of the dried solid granular diammonium phosphate to the classifying means and feeding the diverted portion to the granulator-reactor and setting the classifying means to a narrow size separation whereby a narrow range of the particle size distribution of granular diammonium phosphate produced is enhanced.

Furthermore, when the portion of dried diammonium phosphate diverted to the granulator-reactor is about 30 to 50 percent (50 to 70 percent fed to classifying means), a greater percentage of the granules of the solid granular diammonium phosphate mixture entering the classifying means are in a range of the desired granule size of about 2 mm to 4 mm than without the diversion step to the granulator-reactor.

Preferably, the portion of dried diammonium phosphate diverted to the granulator-reactor is about 40% to yield about 75 to 85 percent of the granules of the solid granular diammonium phosphate mixture entering the classifying means are in a range of the desired granule size of 2 mm to 4 mm. About 90% of the granules collected by the classifying means as product are in a narrow range of the desired granule size of 2 mm to 4 mm.

The process step of diverting and feeding a portion of the product as discharged from the dryer back to the granulator-reactor was expected to increase and expand the broad range of particle sizes produced by the process rather than increasing a narrow range of particles within the broad range. Had this problem occurred the oversize produced would have overtaxed the milling process and rendered the process useless. The diversion step together with the increased production of particle size distribution within a narrow range enabled the screens to be set to a narrow size separation in order to efficiently and effectively collect a narrow cut from the process product. The diversion step tends to aid in building of the 2-4 mm size, especially where preferably about 40 percent dryer output of DAP is diverted.

The process of this invention may be used to increase production of particle size distribution within a narrow range by manipulating the percent of product mixture diverted directly from the dryer and fed into the granulator-reactor while maintaining a narrow cut of product collected by the classifying means. For example, a narrow cut of a 5 mm-7 mm range of granule sizes would be prepared by increasing the percent dried DAP product mixture diverted from the dryer to the granulator-reactor, above approximately 30-50 percent, and setting the screens to select the desired narrow range. The larger particle size is useful in field application by an airplane since the heavier and larger particle tends to fall to the soil rather than being "detained" by a plant leaf and not available to the plant.

The present disclosure includes that contained in the appended claims as well a that of the foregoing description. Although this changes in the details of construction and the combination and arrangement of parts may be resorted to without departing from the spirit and scope of the invention.

What is claimed is:

1. A process for the production of solid granular diammonium phosphate comprising:
reacting anhydrous ammonia with phosphoric acid in a reactor to form a partially reacted slurry of monammonium phosphate and diammonium phosphate;
pumping the slurry to a granulator-reactor and further reacting the slurry with anhydrous ammonia to form a solid granular diammonium phosphate mixture having a particle range size consisting of undersize, oversize and product;
drying the solid granular diammonium phosphate mixture in a dryer;
dividing the dried solid granular diammonium phosphate mixture being discharged from the dryer into a first portion and a second portion;
diverting and feeding the first portion of the dried granular diammonium phosphate mixture back to the granulator-reactor;
feeding the second portion of dried granular diammonium phosphate mixture to a classifying means consisting of a set of screens including an oversize screen and an product screen set to a narrow size separation to separate the mixture of the solid granular diammonium phosphate into undersize, oversize and product solid granular diammonium phosphate;
milling the oversize granular diammonium phosphate;
recycling to the granulator-reactor the milled oversized granular diammonium phosphate and the undersized granular particles obtained during the classifying of the solid granular diammonium phosphate mixture; and
collecting the desired product granular particle thereby enhancing the production of a narrow range of granular diammonium phosphate particle size distribution within a broad range of particle size distribution.

2. The process of claim 1 wherein the oversized screen is about 5 mesh Tyler and the product screen is about 7 mesh Tyler.

3. The process of claim 1 wherein about 30 to 50 percent of the dried granular diammonium phosphate mixture is diverted to the granulator-reactor.

4. The process of claim 3 wherein the oversize screen is a 5 mesh Tyler and the product screen is 7 mesh Tyler.

5. The process of claim 4 wherein about 40% of the dried granular diammonium phosphate mixture is diverted to the granulator-reactor to yield a product where about 90% of the granules collected by the classifying means as product are in a range of a granule size of 2 mm to 4 mm.

6. The process of claim 1 wherein the portion of dried diammonium phosphate is fed directly to the granulator-reactor after discharging the dryer.

7. The process of claim 1 wherein the granulator-reactor is a rotary drum granulator-reactor.

8. A process for the manufacture of solid granular diammonium phosphate comprising:
reacting anhydrous ammonia with phosphoric acid in a reactor to form a partially reacted slurry of monammonium phosphate and diammonium phosphate;
pumping the slurry to a granulator-reactor and further reacting the slurry with anhydrous ammonia to form a solid granular diammonium phosphate mixture having a particle size range consisting of undersize, oversize and product;
drying the solid granular diammonium phosphate mixture;

diverting about 30 to 50 percent of the dried granular diammonium phosphate mixture to the granulator-reactor;

feeding the remaining 50 to 70 percent of dried granular diammonium phosphate mixture to a classifying means consisting of a set of screens including an oversize screen and a product screen set to a narrow size separation to separate the mixture of the solid granular diammonium phosphate into undersize, oversize and product solid granular diammonium phosphate;

milling the oversize granular diammonium phosphate;

recycling the milled oversized granular diammonium phosphate and the undersized granular particles obtained during the classifying of the diammonium phosphate to the granulator-reactor during separation of the solid granular diammonium phosphate mixture; and collecting the desired product granular particle whereby the production of a narrow range of granular diammonium phosphate particle size distribution within a broad range of particle size distribution is enhanced.

9. The process of claim 8 wherein the oversized screen is 5 mesh Tyler and the product screen is 7 mesh Tyler.

10. The process of claim 9 wherein about 40% of the dried granular diammonium phosphate mixture is diverted to the granulator-reactor to yield a product where about 90% of the granules collected by the classifying means as product are in a range of a granule size of 2 mm to 4 mm.

11. A process for the manufacture of granular diammonium phosphate comprising:

reacting anhydrous ammonia with phosphoric acid in a reactor to form a partially reacted slurry of monoammonium phosphate and diammonium phosphate;

pumping the slurry to a granulator-reactor and further reacting the slurry with anhydrous ammonia to form a solid granular diammonium phosphate mixture having a particle size consisting of undersize, oversize and product;

drying the solid granular diammonium phosphate mixture;

diverting about 40% of the dried granular diammonium phosphate mixture to the granulator-reactor whereby about 75 to 85 percent of the granules of the solid granular diammonium phosphate mixture entering the classifying means are in a range of the desired granule size of 2 mm to 4 mm;

feeding the remaining approximately 60% dried granular diammonium phosphate mixture to a classifying means consisting of a set of screens including an oversize screen of 5 mesh Tyler and a product screen of 7 mesh Tyler to separate the mixture of the solid granular diammonium phosphate into undersize, oversize and product solid granular diammonium phosphate portions;

milling the oversize granular diammonium phosphate;

recycling the milled oversized granular diammonium phosphate and the undersized granular particles obtained during the classifying of the diammonium phosphate to the granulator-reactor during separation of the solid granular diammonium phosphate mixture; and collecting the desired product granular particle whereby about 90% of the granules collected by the classifying means as product are in a range of a granule size of 2 mm to 4 mm.

* * * * *